(12) United States Patent
Wang

(10) Patent No.: US 9,818,292 B2
(45) Date of Patent: Nov. 14, 2017

(54) CONTROL SYSTEM FOR A ROTARY LASER

(71) Applicant: NORTHWEST INSTRUMENT (SHANGHAI) CO., LTD, Shanghai (CN)

(72) Inventor: Xianqi Wang, Shanghai (CN)

(73) Assignee: NORTHWEST INSTRUMENT (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 15/032,665

(22) PCT Filed: Dec. 13, 2013

(86) PCT No.: PCT/CN2013/089358
§ 371 (c)(1),
(2) Date: Apr. 28, 2016

(87) PCT Pub. No.: WO2015/081584
PCT Pub. Date: Jun. 11, 2015

(65) Prior Publication Data
US 2016/0275784 A1  Sep. 22, 2016

(30) Foreign Application Priority Data
Dec. 6, 2013 (CN) .......................... 2013 1 0658826

(51) Int. Cl.
G08C 17/02 (2006.01)
H04N 1/04 (2006.01)
H04W 4/00 (2009.01)

(52) U.S. Cl.
CPC ............... G08C 17/02 (2013.01); H04N 1/04 (2013.01); H04W 4/008 (2013.01); *G08C 2201/40* (2013.01)

(58) Field of Classification Search
CPC .................... G08C 17/02; G08C 2201/93; G08C 2201/30; G08C 2201/20; G08C 2201/92;
(Continued)

(56) References Cited

U.S. PATENT DOCUMENTS 7,081,606 B2 *  7/2006  Osaragi ................... E02F 3/847
                                                                172/4.5
7,196,302 B2 *  3/2007  Ohtomo ............... G01C 15/002
                                                                250/206.2
(Continued)

FOREIGN PATENT DOCUMENTS

CN       2487034 Y      4/2002
CN    101751121 A      6/2010
(Continued)

OTHER PUBLICATIONS

International Search Report dated Jun. 25, 2014.

*Primary Examiner* — Mark Blouin
(74) *Attorney, Agent, or Firm* — Dority & Manning, P.A.

(57) ABSTRACT

A control system for a rotary laser receives control information transmitted by a communications terminal via a first repeater coupled to the communications terminal and transmits the control information to a controller via a second repeater disposed on a rotary laser. The controller regulates an operating state of the rotary laser based on the control information. The control system enables the communication terminal to wirelessly control and operating state of the rotary laser via cooperation between the first repeater and the second repeater so as to achieve a remote control and to avoid use of a dedicated remote control alone, reduce the system costs and be carried easily.

17 Claims, 2 Drawing Sheets

(58) Field of Classification Search
CPC . G08C 23/04; G08C 2201/32; G08C 2201/70
USPC .......................................................... 340/12.5
See application file for complete search history.

(56) References Cited

U.S. PATENT DOCUMENTS

| | | | | |
|---|---|---|---|---|
| 7,221,314 | B2* | 5/2007 | Brabec | G01C 15/002 342/357.27 |
| 7,456,943 | B1* | 11/2008 | Goad | G01C 15/002 342/118 |
| 8,151,474 | B2* | 4/2012 | Kumagai | G01C 15/004 33/290 |
| 8,619,250 | B2* | 12/2013 | Hayashi | G01C 15/008 356/139.01 |
| 8,857,068 | B2* | 10/2014 | Kodaira | G01C 15/004 33/290 |
| 8,959,783 | B2* | 2/2015 | Kumagai | G01C 15/004 33/228 |
| 9,222,772 | B2* | 12/2015 | Munroe | G01B 11/26 |
| 9,608,692 | B2* | 3/2017 | Bennett | H04B 3/36 |
| 2002/0186420 | A1 | 12/2002 | Wu | |
| 2002/0196478 | A1 | 12/2002 | Struble | |
| 2006/0001916 | A1 | 1/2006 | Sheng et al. | |
| 2010/0104291 | A1* | 4/2010 | Ammann | G01C 15/004 398/106 |
| 2010/0215433 | A1* | 8/2010 | Fritz | E01C 19/006 404/84.5 |
| 2016/0290801 | A1* | 10/2016 | Horky | G08C 17/02 |

FOREIGN PATENT DOCUMENTS

| | | |
|---|---|---|
| CN | 202077108 U | 12/2011 |
| CN | 202394243 U | 8/2012 |
| TW | 200603607 A | 12/2006 |

* cited by examiner

CONTROL SYSTEM FOR A ROTARY LASER

CROSS-REFERENCE TO RELATED APPLICATIONS

This application claims priority to International Application Ser. No. PCT/CN2013/089358, filed Dec. 13, 2013, which claims priority to Chinese Application No. 201310658826.2, filed Dec. 6, 2013. International Application Ser. No. PCT/CN2013/089358 is hereby incorporated herein in its entirety for all purposes by this reference.

TECHNICAL FIELD

The present disclosure relates to the field of rotary laser control, and more particularly to a control system for a rotary laser.

BACKGROUND OF THE INVENTION

A laser rotary laser is a laser scanning instrument developed on the basis of the traditional optical scanner with a higher swinging precision and working distance and it is more convenient and flexible to be used. Therefore, it is widely used in geodetic surveying, engineering surveying and large-scale installation and excavation, and so on.

At present, the laser rotary laser usually uses infrared technology for remote control, while for the remote control using infrared technology, the communication distance is short, generally not more than 50 meters.

SUMMARY OF THE INVENTION

In view of this, the present disclosure provides a control system for a rotary laser in order to solve the problem of using infrared technology for remote control and thus the communication distance being short in the existing technology, and its specific solution is as follows. A control system to be applied to a rotary laser includes a first repeater coupled to a communication terminal for receiving control information transmitted by the communication terminal. A second repeater is coupled to the first repeater and is disposed on the rotary laser for wirelessly receiving the control information transmitted by the first repeater. A controller is coupled to the second repeater for receiving the control information transmitted by the second repeater and regulating an operating state of the rotary laser based on the control information.

Furthermore, the communication terminal has a first Bluetooth module built in, and the first repeater includes a second Bluetooth module for receiving and transmitting the control information transmitted by the communication terminal via the first Bluetooth module. The first repeater also includes a processor coupled to the second Bluetooth module for receiving the control information transmitted by the second Bluetooth module and transmitting control instructions based on the control information. The first repeater additionally includes a wireless communication module coupled to the processor for opening a wireless transceiver function based on the control instructions transmitted by the processor and transmitting the control information contained in the control instructions. Furthermore, the wireless communication module is specifically a 915 MHz wireless module.

Furthermore, the system also can include a third repeater, wherein the third repeater is coupled to the communication terminal and the controller, respectively, for receiving state information transmitted by the controller via the second repeater and transmitting the state information to the communication terminal.

Furthermore, the system also can include a rotary laser detector for detecting signals of the rotary laser, wherein the third repeater is disposed on the rotary laser detector. Furthermore, in some embodiments the third repeater and the first repeater are the same repeater.

Furthermore, the system also can include a rotary laser detector for detecting signals of the rotary laser, wherein the first repeater is disposed on the rotary laser detector.

Furthermore, the system also can include a rotary laser detector for detecting signals of the rotary laser and a tripod for supporting the rotary laser detector. Moreover, in some embodiments the first repeater is disposed on the tripod. Furthermore, in some embodiments the first repeater is disposed on a shell of the communication terminal. Furthermore, in some embodiments the first repeater is disposed on a key ring.

It can be seen from the above technical solutions that the control system disclosed by the present disclosure receives control information transmitted by a communication terminal via a first repeater coupled to the communication terminal and transmits the control information to a controller via a second repeater disposed on a rotary laser, and the controller regulates an operating state of the rotary laser based on the control information. The present solutions implement, via cooperation between the first repeater and the second repeater, remote control of an operating state of the rotary laser based on the communication terminal to thereby achieve the remote control and avoid the problem of limited communication distance due to the infrared remote control. Meanwhile, the remote control can be achieved by the communication terminal carried by a user, which avoids use of a dedicated remote control alone, reduces the system cost, and is portable.

BRIEF DESCRIPTION OF THE DRAWINGS

In order to explain the technical solution in the embodiments of the present disclosure or the prior art more clearly, a brief introduction will be made below to the accompanying drawings that are to be used in the descriptions of the embodiments or the prior art. Obviously, the accompanying drawings in the following descriptions are only some embodiments of the present disclosure, and for those of ordinary skill in the art, other accompanying drawings can also be obtained based on these accompanying drawings on the premise of paying no creative work.

DESCRIPTION OF PREFERRED EMBODIMENTS

The technical solution in the embodiments of the present disclosure will be described clearly and completely below in conjunction with the accompanying drawings that schematically present embodiments of the present disclosure. Obviously, the described embodiments are only exemplary embodiments of the present disclosure, rather than all of the embodiments. Based on the embodiments in the present disclosure, all of the other embodiments obtained by those of ordinary skill in the art on the premise of paying no creative work fall into the protection scope of the present disclosure.

Figure 1:
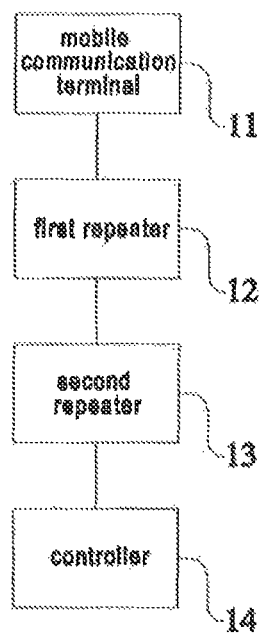
FIG. 1 is a schematic diagram of the structure of a control system for a rotary laser disclosed by embodiments of the present disclosure.

An exemplary embodiment discloses a control system to be applied to a rotary laser, and the schematic diagram of its structure is shown in FIG. 1. Accordingly, a control system includes a mobile communication terminal 11, a first repeater 12 coupled to the mobile communication terminal 11, a second repeater 13 coupled to the first repeater 12, and a controller 14 coupled to the second repeater 13. Herein, the second repeater 13 and the controller 14 are both disposed on the rotary laser.

The mobile communication terminal 11 transmits control information to the first repeater 12 based on operation of a user, and the first repeater 12 receives the control information transmitted by the mobile communication terminal 11 and transmits the control information to the second repeater 13. The second repeater 13 wirelessly receives the control information and transmits the control information to the controller 14, and the controller 14 regulates an operating state of the rotary laser based on the received control information. The mobile communication terminal 11 specifically can be a mobile phone that has rotary laser APP software installed on it, and the user may transmit the control information based on the rotary laser APP software.

The control system for a rotary laser disclosed by the embodiment schematically represented in FIG. 1 receives the control information transmitted by the mobile communication terminal 11 via the first repeater 12 coupled to the mobile communication terminal 11 and transmits the control information to the controller 14 via the second repeater 13 disposed on the rotary laser, and the controller 14 regulates an operating state of the rotary laser based on the control information. The present solution implements, via cooperation between the first repeater 12 and the second repeater 13, remote control of an operating state of the rotary laser based on the mobile communication terminal 11 to thereby achieve the remote control and avoid the problem of limited communication distance due to the infrared remote control. Meanwhile, the remote control can be achieved by the mobile communication terminal 11 carried by a user, which avoids use of a dedicated remote control alone, reduces the system cost, and is portable.

Furthermore, in the control system for a rotary laser disclosed by the embodiment schematically represented in FIG. 1, the first repeater 12 can implement transmitting of both the control information of the mobile communication terminal and the state information of the rotary laser. That is, the first repeater 12 receives the state information of the rotary laser transmitted by the controller 14 and transmits the state information to the mobile communication terminal 11 so that the user can know the state information of the rotary laser in real time so as to implement information interaction and improve the maneuverability.

Figure 2:
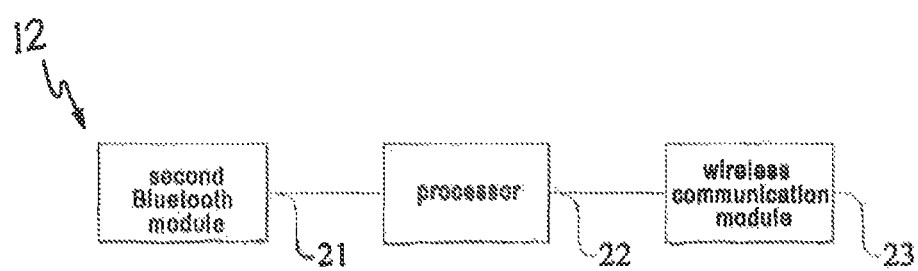
FIG. 2 is a schematic diagram of the structure of a first repeater disclosed by embodiments of the present disclosure.

The present embodiment discloses a first repeater 12, and the schematic diagram of its structure is shown in FIG. 2. The mobile communication terminal 11 has a first Bluetooth module built in, and implements information transfer with the first repeater 12 via the first Bluetooth module. The first repeater 12 disclosed by the embodiment schematically represented in FIG. 2 includes a second Bluetooth module 21, a processor 22 coupled to the second Bluetooth module 21, and a wireless communication module 23 coupled to the processor 22.

The second Bluetooth module 21 is coupled to the first Bluetooth module to receive the control information transmitted by the mobile communication terminal 11 and transmit the received control information to the processor 22. The processor 22 receives the control information transmitted by the second Bluetooth module 21 and transmits control instructions to the wireless communication module 23 based on the control information, wherein the control instructions contain the control information and an instruction for opening the transceiver function of the wireless communication module.

The wireless communication module 23 receives the control instructions transmitted by the processor 22 and opens the wireless transceiver function based on the control instructions, and meanwhile transmits the control information contained in the control instructions to the second repeater. Herein, the processor 22 communicates with the wireless communication module 23 via a SPI bus, and the processor 22 transmits the control information in the control instructions to a receive buffer of the wireless communication module 23. The wireless communication module 23 performs GMSK (Gaussian Filtered Minimum Shift Keying) modulation on the control information, and then transmits it to the second repeater. After receiving the GMSK modulated control information, the second repeater demodulates it to obtain the control information.

Specifically, in the first repeater 12 disclosed by the embodiment schematically represented in FIG. 2, the wireless communication module 23 specifically may be a 915 MHz wireless module.

The first repeater 12 disclosed by the embodiment schematically represented in FIG. 2 receives, via the second Bluetooth module, the control information transmitted by the first Bluetooth module and transmits the control information to the processor 22, and the processor 22 generates control instructions based on the control information so that the wireless communication module 23 can open the wireless transceiver function and meanwhile transmits the control information contained in the control instructions. The first repeater 12 disclosed by the embodiment schematically represented in FIG. 1 cooperates with the second repeater 13 to achieve the objective of remote transmitting of the control information to the controller 14 to thereby wirelessly control the rotary laser. It effectively enlarges the communication distance and implements remote monitoring and controlling of the state of the rotary laser.

Preferably, the second repeater 13 has the substantially same basic structure as the first repeater 12 disclosed by the embodiment schematically represented in FIG. 2.

Figure 3:
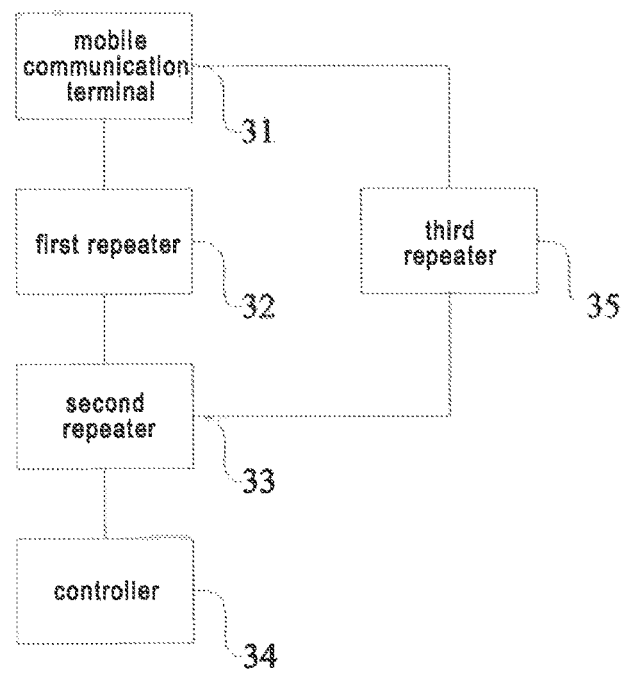
FIG. 3 is a schematic diagram of the structure of a control system for a rotary laser disclosed by embodiments of the present disclosure.

Another embodiment discloses a control system to be applied to a rotary laser, and the schematic diagram of its basic structure is shown in FIG. 3 and includes a mobile communication terminal 31, a first repeater 32 coupled to the mobile communication terminal 31, a second repeater 33 coupled to the first repeater 32, a controller 34 coupled to the second repeater 33, and a third repeater 35 respectively coupled to the mobile communication terminal 31 and the second repeater 33.

In addition to the same structure as the first embodiment schematically represented in FIGS. 1 and 2, the third repeater 35 is further included in this embodiment schematically represented in FIG. 3. The third repeater 35 receives the state information transmitted by the controller 34 via the second repeater 33 and transmits the received state information to the mobile communication terminal 31 via the Bluetooth module in the third repeater.

The control system for a rotary laser disclosed by the embodiment schematically represented in FIG. 3 implements, by adding the third repeater 35, transmitting of the state information of the rotary laser so that the user can have the state information of the rotary laser in real time at a remote position. Herein, the first repeater 32 is used to transmit the control information and the third repeater 35 is used to transmit the state information, and thus their functions are separated to avoid confusion.

Preferably, the control system for a rotary laser disclosed by the embodiment schematically represented in FIG. 3 further includes a rotary laser detector for detecting signals emitted from the rotary laser, and a tripod for supporting the rotary laser detector. The third repeater 35 may be disposed on either the rotary laser detector or the tripod, and meanwhile it can also be disposed on a scale or a key ring if only it can enable the mobile communication terminal to remote control and monitor the rotary laser at a remote position.

Figure 4:
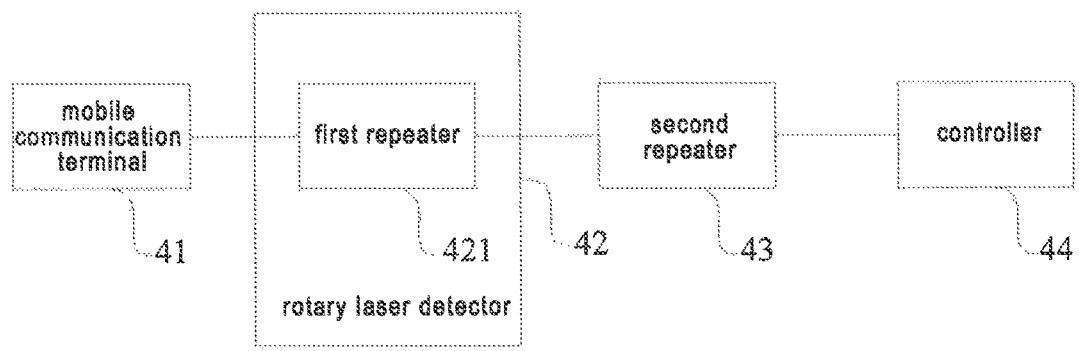
FIG. 4 is a schematic diagram of the structure of a control system for a rotary laser disclosed by embodiments of the present disclosure.

Another embodiment discloses a control system to be applied to a rotary laser, and the schematic diagram of its structure is shown in FIG. 4 and includes a mobile communication terminal 41, a rotary laser detector 42, a first repeater 421 disposed on the rotary laser detector 42, a second repeater 43 coupled to the first repeater 421, and a controller 44 coupled to the second repeater 43. The mobile communication terminal 41 transmits control information via the first repeater 421.

The second repeater 43 is disposed on the rotary laser, and it receives the control information transmitted by the first repeater 421 and transmits the control information to the controller 44. The controller 44 receives the control information transmitted by the second repeater 43 and regulates operating state of the rotary laser based on the control information.

The control system for a rotary laser disclosed by the embodiment schematically represented in FIG. 4 transmits the control information based on the first repeater 421 via the mobile communication terminal 41 and transmits the control information to the controller 44 via the second repeater 43 disposed on the rotary laser, and the controller 44 regulates an operating state of the rotary laser based on the control information. The present solution implements, via cooperation between the first repeater 421 and the second repeater 43, remote control of an operating state of the rotary laser based on the mobile communication terminal 41 to thereby achieve the remote control and avoid the problem of limited communication distance due to the infrared remote control. Meanwhile, the remote control can be achieved by the mobile communication terminal 41 carried by a user, which avoids use of a dedicated remote control alone, reduces the system cost, and is portable. Meanwhile, in the present embodiment schematically represented in FIG. 4, the first repeater 421 is disposed on the rotary laser detector 42, and thus the first repeater 421 may be easily carried to avoid loss by detecting signals of the rotary laser by the rotary laser detector 42.

Further, the first repeater 421 disclosed by the embodiment schematically represented in FIG. 4 specifically includes a second Bluetooth module, a processor and a wireless communication module. Herein, the wireless communication module specifically can be a 915 MHz wireless module.

The first repeater 421 is disposed on a shell of the mobile communication terminal 41. When transmitting the control information, the control information is transmitted to the second Bluetooth module in the first repeater 421 by the first Bluetooth module inside the mobile communication terminal 41 and is then transmitted to the second repeater 43 from the first repeater 421.

Further, in the control system disclosed by the embodiment schematically represented in FIG. 4, the first repeater 421 can implement transmitting of both the control information of the mobile communication terminal 41 and the state information of the rotary laser. That is, the first repeater 421 receives the state information of the rotary laser transmitted by the controller 44 and transmitted the state information to the mobile communication terminal 41 so that the user can know the state information of the rotary laser in real time so as to implement information interaction and improve the maneuverability.

In addition, when in the control system disclosed by the embodiment schematically represented in FIG. 4, the first repeater 421 is only used to transmit the control information of the mobile communication terminal 41, the control system disclosed by the embodiment may further comprise a third repeater. Herein, the third repeater receives the state information of the rotary laser transmitted by the controller 44 and transmits the state information to the mobile communication terminal 41 so that the user can know the state information of the rotary laser in real time so as to implement information interaction and improve the maneuverability.

In addition, it should be noted that the third repeater in the embodiments can be disposed separately or be disposed on the rotary laser detector or the shell of the mobile communication terminal. Similarly, the third repeater can be disposed on a tripod for supporting the rotary laser detector, a shell of the mobile communication terminal, or other objects such as a scale, a key ring, etc., if it is dedicated to remote transmitting of the state information of the rotary laser.

The first repeater disclosed by the embodiments not only can be disposed on the rotary laser detector or the shell of the mobile communication terminal, but also can be disposed separately, or disposed on a tripod for supporting the rotary laser detector or objects such as a scale or a key ring, etc., if it is dedicated to remote transmitting of the control information sent by the mobile communication terminal.

Respective embodiments of the present specification are described in a progressive manner, and each embodiment is mainly explained by its difference from other embodiments, and thus the same or similar parts between respective embodiments may refer to each other.

Those skilled in the art can also be further aware that respective exemplary units and algorithm steps as described in conjunction with the embodiments of the present application may be implemented as electronic hardware, computer software, or a combination of both. In order to clearly express such interchangeability between hardware and software, the respective exemplary components and steps have been depicted in general with regard to the functions in the above descriptions. As to whether the functions are implemented in hardware or software, it depends on a specific application and a design constraint condition applied on the technical solution. Those skilled in the art may implement the depicted functions in a different manner for each specific application. However, such an implementation should not be construed as departing from the protection scope of the present disclosure.

The method or algorithm steps described in conjunction with embodiments of the present application can be implemented directly by hardware, software modules executed by the processor, or a combination of both. The software modules can be disposed in a random access memory (RAM), a memory, a read-only memory (ROM), an electrically programmable ROM, an electrically erasable programmable ROM, a register, a hard disk, a removable disk, CD-ROM, or any other form of storage medium known in the art.

The above descriptions of the disclosed embodiments enable those skilled in the art to implement or use the present disclosure. Various modifications of these embodiments are obvious for those skilled in the art, and the general principle as defined herein may also be applied to other embodiments without departing from the spirit or scope of the present disclosure. Thus, the present disclosure is not limited to the embodiments as described herein, but is consistent with the broadest scope of the principle and novel characteristics of the present disclosure.

The invention claimed is:

1. A control system to be applied to a rotary laser, comprising:
    a first repeater coupled to a communication terminal for receiving control information transmitted by the communication terminal;
    a second repeater coupled to the first repeater and disposed on the rotary laser for wirelessly receiving the control information transmitted by the first repeater; and
    a controller coupled to the second repeater for receiving the control information transmitted by the second repeater and regulating an operating state of the rotary laser based on the control information.

2. The control system according to claim 1, wherein the communication terminal has a first Bluetooth module built in, and the first repeater comprises:
    a second Bluetooth module for receiving and transmitting the control information transmitted by the communication terminal via the first Bluetooth module;
    a processor coupled to the second Bluetooth module for receiving the control information transmitted by the second Bluetooth module and transmitting control instructions based on the control information; and
    a wireless communication module coupled to the processor for opening a wireless transceiver function based on the control instructions transmitted by the processor and transmitting the control information contained in the control instructions.

3. The control system according to claim 2, wherein the wireless communication module is specifically a 915 MHz wireless module.

4. The control system according to claim 1, further comprising a third repeater,
    wherein the third repeater is coupled to the communication terminal and the controller, respectively, for receiving state information of the rotary laser transmitted by the controller via the second repeater and transmitting the state information to the communication terminal.

5. The control system according to claim 4, further comprising a rotary laser detector for detecting signals of the rotary laser,
    wherein the third repeater is disposed on the rotary laser detector.

6. The control system according to claim 4, wherein the third repeater and the first repeater are the same repeater.

7. The control system according to claim 1, further comprising a rotary laser detector for detecting signals of the rotary laser,
    wherein the first repeater is disposed on the rotary laser detector.

8. The control system according to claim 1, further comprising a rotary laser detector for detecting signals of the rotary laser and a tripod for supporting the rotary laser detector,
    wherein the first repeater is disposed on the tripod.

9. The control system according to claim 1, wherein the first repeater is disposed on a shell of the communication terminal.

10. The control system according to claim 1, wherein the first repeater is disposed on a key ring.

11. A wireless control system for an instrument, comprising:
    a first repeater that includes a wireless module connecting the instrument to a mobile communication terminal, the first repeater further including a processor controlling the wireless module;
    a second repeater disposed on the instrument and receiving control information from the first repeater;
    a controller disposed on the instrument and connected to the second repeater;
    wherein the instrument is operated by the controller based on the control information;
    wherein state information of the instrument is transmitted to the mobile communication terminal through the first repeater and the second repeater.

12. The wireless control system according to claim 11, wherein the wireless module is connected to the mobile communication terminal by Bluetooth.

13. The wireless control system according to claim 11, wherein the first repeater is disposed on an instrument detector for detecting light emitting from the instrument in a distant place.

14. The wireless control system according to claim 11, wherein the first repeater is disposed on a shell of the mobile communication terminal for detecting light emitting from the instrument in a distant place.

15. A control system for an instrument, comprising:
    a first repeater for receiving a control signal emitted wirelessly from a communication terminal and amplifying the control signal into an amplified signal;
    a second repeater set on the instrument for receiving the amplified signal;
    a controller disposed on the instrument and electrically connected to the second repeater;
    wherein the instrument is regulated by the controller based on the amplified signal.

16. The control system according to claim 15, wherein the controller is configured to transmit state information of the instrument to the communication terminal via the first repeater and the second repeater.

17. The control system according to claim 15, wherein the first repeater is separate from the communication terminal and the instrument.

* * * * *

UNITED STATES PATENT AND TRADEMARK OFFICE
CERTIFICATE OF CORRECTION

PATENT NO. : 9,818,292 B2  
APPLICATION NO. : 15/032665  
DATED : November 14, 2017  
INVENTOR(S) : Xianqi Wang Page 1 of 1

It is certified that error appears in the above-identified patent and that said Letters Patent is hereby corrected as shown below:

On the Title Page

Item (73), should read:  
Assignee: NORTHWEST INSTRUMENT INC.

Signed and Sealed this  
Ninth Day of July, 2019

Andrei Iancu  
*Director of the United States Patent and Trademark Office*